(12) United States Patent
Maeda

(10) Patent No.: US 9,286,307 B2
(45) Date of Patent: Mar. 15, 2016

(54) DOCUMENT MANAGEMENT APPARATUS IMPROVED IN EFFICIENCY OF DELETION OF FILES, METHOD OF CONTROLLING THE SAME, AND STORAGE MEDIUM

(71) Applicant: CANON KABUSHIKI KAISHA, Tokyo (JP)

(72) Inventor: Ryo Maeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 124 days.

(21) Appl. No.: 13/678,689

(22) Filed: Nov. 16, 2012

(65) Prior Publication Data
US 2013/0132447 A1    May 23, 2013

(30) Foreign Application Priority Data

Nov. 22, 2011    (JP) .................................. 2011-255055

(51) Int. Cl.
*G06F 12/00*    (2006.01)
*G06F 17/30*    (2006.01)

(52) U.S. Cl.
CPC ................................ *G06F 17/30117* (2013.01)

(58) Field of Classification Search
CPC .................... G06F 17/30067; G06F 17/30233; G06F 3/0643
See application file for complete search history.

(56) References Cited

U.S. PATENT DOCUMENTS

| 2003/0065873 | A1* | 4/2003 | Collins et al. | ................. | 711/100 |
| 2004/0162876 | A1* | 8/2004 | Kohavi | ......................... | 709/203 |
| 2005/0149571 | A1* | 7/2005 | Jeon et al. | .................. | 707/104.1 |
| 2006/0010150 | A1* | 1/2006 | Shaath et al. | ................. | 707/102 |
| 2006/0288304 | A1* | 12/2006 | Nomoto et al. | ............... | 715/781 |
| 2007/0112743 | A1* | 5/2007 | Giampaolo | ....... | G06F 17/30126 |
| 2008/0077627 | A1 | 3/2008 | Yachi | | |
| 2008/0292266 | A1* | 11/2008 | Kim | ............................... | 386/52 |
| 2010/0257127 | A1* | 10/2010 | Owens | .......................... | 706/12 |
| 2010/0306175 | A1* | 12/2010 | Johnson | ............ | G06F 17/30085 707/663 |
| 2011/0145709 | A1* | 6/2011 | Yoo et al. | ...................... | 715/730 |
| 2011/0149086 | A1* | 6/2011 | Winbush, III | .............. | 348/207.1 |

FOREIGN PATENT DOCUMENTS

| JP | 2000-305829 A | 11/2000 |
| JP | 2008083989 A | 4/2008 |
| JP | 2010224672 A | 10/2010 |

OTHER PUBLICATIONS

Office Action issued in JP2011-255055, mailed Sep. 29, 2015.

* cited by examiner

*Primary Examiner* — Tuan A Pham
(74) *Attorney, Agent, or Firm* — Rossi, Kimms & McDowell LLP

(57) ABSTRACT

A document management apparatus which, when an instruction for collective deletion of files and folders is given, is not required to wait until a user terminates manipulation of a file or a folder, thereby making it possible to enhance working efficiency of the system administrator. A file management system manages a plurality of files. A main controller and a user interface receive an instruction for collectively deleting the files managed by the file management system. The file management system deletes the files according to the instruction. When the instruction is received, a CPU controls the file management system such that out of the plurality of files, files being accessed are deleted after files not being accessed are deleted.

6 Claims, 4 Drawing Sheets

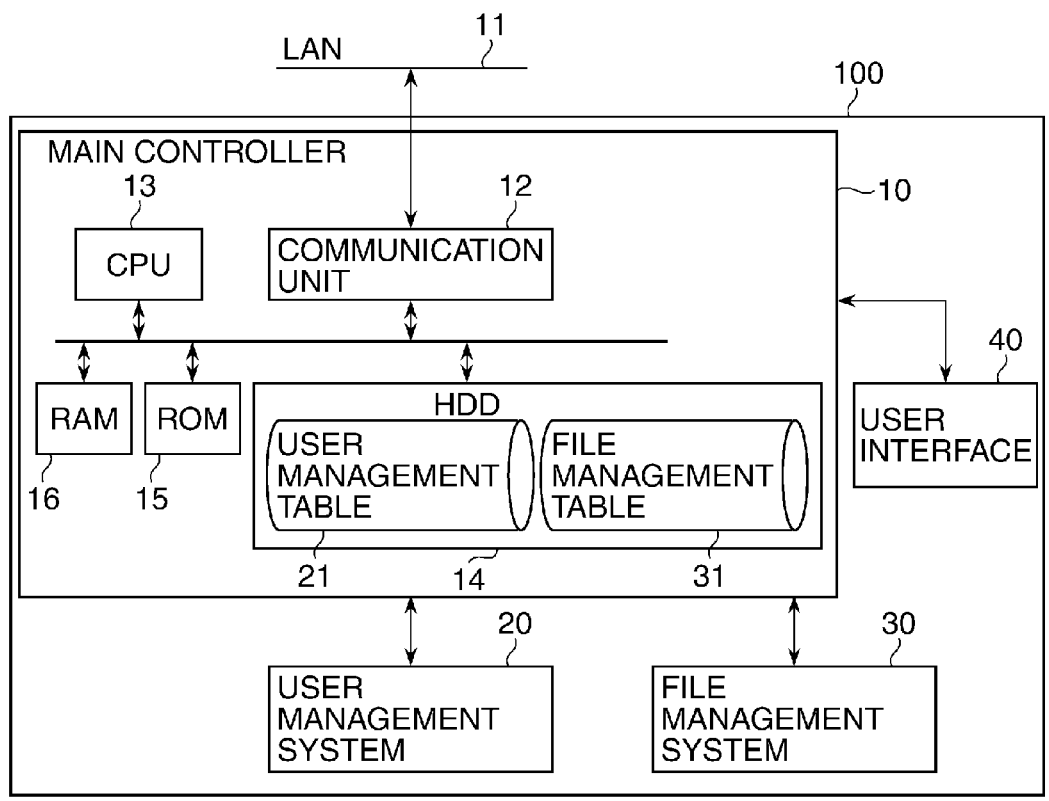

| ID | FILE NAME | LOCKED STATE | OWNER NAME | DISPLAY STATE | ACCESS RIGHTS |
|---|---|---|---|---|---|
| 1 | FILE 1 | TRUE | USER A | TRUE | rwx rwx rwx |
| 2 | FILE 2 | FALSE | USER A | TRUE | rw- rw- rw- |
| 3 | FILE 3 | FALSE | USER C | TRUE | r-- --- --- |
| 4 | FILE 4 | FALSE | USER D | TRUE | rwx --- --- |

34

DOCUMENT MANAGEMENT APPARATUS IMPROVED IN EFFICIENCY OF DELETION OF FILES, METHOD OF CONTROLLING THE SAME, AND STORAGE MEDIUM

BACKGROUND OF THE INVENTION

1. Field of the Invention

The present invention relates to a document management apparatus, a method of controlling the document management apparatus, and a storage medium, and more particularly to a technique for initialization in a document management apparatus.

2. Description of the Related Art

In recent years, with the widespread use of a file server having a document management function (hereinafter also referred to as the "document management apparatus"), there has been an increasing opportunity for a plurality of users to use the same document management apparatus. In the document management apparatus shared by the users, the access rights of the users are assigned on a file basis or on a folder basis, whereby files can be used only by specific users or shared within a group.

Such a document management apparatus has a system administrator for performing maintenance thereof. The system administrator can access all files or folders to change or delete the same. Further, the system administrator can initialize the document management apparatus and collectively delete all the files or folders.

In a case where the system administrator collectively deletes all the files or folders stored in the document management apparatus, it is required to delete a large number of files or folders therefrom, which takes time and makes it impossible to perform other operations. Particularly in the case of a built-in document management apparatus, a large number of management files are used for protection against e.g. power interruption of the document management apparatus, whereby it takes much longer time to delete the files or folders than in the case of a general file server. This is for the following reasons: The document management apparatus has, as a function peculiar to the built-in apparatus, for example, information on subfolders in the form of lists in order to increase the acquisition speed of file lists, and hence when files or folders are deleted or moved, list information of parent folders is updated. Further, backup files are created in order to prevent a mismatch from occurring between files or folders when the apparatus is re-started after being forcedly powered off during halfway through the deletion process.

In Japanese Patent Laid-Open Publication No. 2000-305829, a deletion flag is set in response to an instruction for deleting a file, and a file for which the deletion flag has been set is not displayed in a file list. Then, after the lapse of a predetermined time period, the file for which the deletion flag has been set is actually deleted in background processing. This causes deletion of the files to be apparently completed immediately after the instruction for deleting the file is given, and hence it is possible to perform other operations.

In a general document management apparatus, when a file is being manipulated, the file is locked such that users other than a user manipulating the file cannot modify or change the file, and hence when the file is attempted to be deleted, the deletion fails. As a consequence, when the user is manipulating a file, if a system administrator intends to perform collective deletion of files including the file, an error occurs.

According to the method disclosed in Japanese Patent Laid-Open Publication No. 2000-305829, if a file is being manipulated, the collective deletion of files including the file fails, and hence available resources are reduced until execution of deletion processing at a next timing. Further, when the document management apparatus is configured to record history on operations, a log of the deletion failure is recorded in the history. Therefore, the system administrator is required to execute collective deletion only after a file manipulation by a user is terminated. Particularly in the built-in document management apparatus, it takes a long time to delete files and folders, which brings about a problem that it takes much time for the system administrator to perform maintenance of the apparatus.

SUMMARY OF THE INVENTION

The present invention provides a document management apparatus which, when an instruction for collective deletion of files and folders is given, is not required to wait until a user terminates manipulation of a file or a folder, thereby making it possible to enhance working efficiency of the system administrator, a method of controlling the document management apparatus, and a storage medium.

In a first aspect of the present invention, there is provided a document management apparatus comprising a management unit configured to manage a plurality of files, a receiving unit configured to receive an instruction for collectively deleting the plurality of files managed by the management unit, a deletion unit configured to delete the plurality of files according to the instruction, and a control unit configured to perform control, when the instruction is received by the receiving unit, such that out of the plurality of files, files being accessed are deleted after files not being accessed are deleted.

In a second aspect of the present invention, there is provided a method of controlling a document management apparatus including a management unit configured to manage a plurality of files, comprising receiving an instruction for collectively deleting the plurality of files being managed, deleting the plurality of files according to the instruction, and performing control, when the instruction is received, such that out of the plurality of files, files being accessed are deleted after files not being accessed are deleted.

In a third aspect of the present invention, there is provided a non-transitory computer-readable storage medium storing a computer-executable program for causing a computer to execute a method of controlling a document management apparatus including a management unit configured to manage a plurality of files, wherein the method comprises receiving an instruction for collectively deleting the plurality of files being managed, deleting the plurality of files according to the instruction, and performing control, when the instruction is received, such that out of the plurality of files, files being accessed are deleted after files not being accessed are deleted.

According to the present invention, when an instruction for collective deletion of files and folders is given, it is not required to wait until a user terminates manipulation of a file or a folder, thereby being capable of enhancing working efficiency of the system administrator.

Further features of the present invention will become apparent from the following description of exemplary embodiments with reference to the attached drawings.

BRIEF DESCRIPTION OF THE DRAWINGS

FIG. 1 is a schematic functional block diagram of a document management apparatus according to an embodiment of the present invention.

FIG. 2 is a view showing an example of a user management table appearing in FIG. 1.

DESCRIPTION OF THE EMBODIMENTS

Figures 3A, 3B:
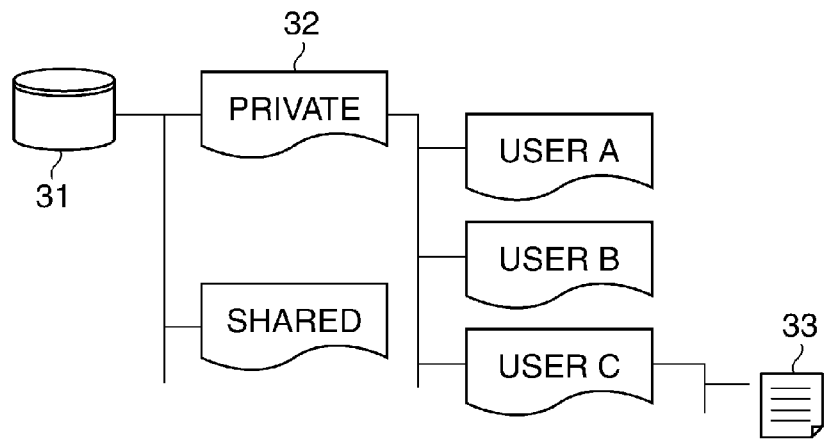
FIG. 3A is a view of a structure of the user management table.
FIG. 3B is a view showing an example of a file attribute table stored in the user management table.

The present invention will now be described in detail below with reference to the accompanying drawings showing embodiments thereof.

FIG. 1 is a schematic functional block diagram of a document management apparatus according to an embodiment of the present invention.

The document management apparatus 100 is a file server equipped with a document management function, and comprises a main controller 10, a user management system 20, a file management system 30, and a user interface 40. The main controller 10 controls the user management system 20, the file management system 30, and the user interface 40.

The main controller 10 comprises a communication unit 12, a CPU (central processing unit) 13, an HDD (hard disk drive) 14, a ROM (read only memory) 15, and a RAM (random access memory) 16. The communication unit 12 is a network interface (I/F) supporting various types of communication protocols, such as SMB (server message block), WebDAV (web distributed authoring and versioning), FTP (file transfer protocol), and e-mail. Further, the communication unit 12 is connected to a LAN (local area network) 11, which is a network, and exchanges data with an external apparatus using the above-mentioned communication protocols.

The CPU 13 controls the overall operation of the document management apparatus 100. The HDD 14 is a hard disk drive which serves as a storage device for storing document data, setting data, and so forth. Note that for the HDD 14, a flash memory, for example, may be used. The ROM 15 is a boot ROM, and stores a boot program for the system. The CPU 13 operates based on programs read out from the ROM 15. The RAM 16 is a system work memory for operation of the CPU 13.

The user management system 20 manages the registration, update, and deletion of user accounts using a user management table 21 stored in the HDD 14. An example of the user management table 21 is shown in FIG. 2.

Referring to FIG. 2, the user management system 20 comprises a list of user information. The user information comprises attributes indicative of details of each user. For example, as shown in FIG. 2, the attributes of each user include a user ID, a user name, rights, and a registration date. The item of "rights" of the user information stores a flag for identifying whether or not the user is an ordinary user or a system administrator. The ordinary user can view, edit, and delete only files or folders to which the user's access rights are granted. The system administrator can view, edit, and delete all the files and the folders. Note that although the user management table 21 is stored in the HDD 14, it may be stored and managed in the external apparatus on the LAN 11.

The main controller 10 reads out a program from the ROM 15 and executes a process, described hereinafter. The CPU 13 reads in the user management table 21 stored in the HDD 14 via the user management system 20, and temporarily stores the user management table 21 in the RAM 16. Then, the CPU 13 updates the contents of the user management table 21 temporarily stored in the RAM 16 according to the registration, update, and deletion of the user information. After termination of the update process of the user management table 21, the CPU 13 updates the user management table 21 stored in the HDD 14 based on the contents of the user management table 21 temporarily stored in the RAM 16.

The file management system 30 manages the files and folders using a file management table 31 stored in the HDD 14. The file management system 30 recognizes the attributes of owners and groups given on a file basis and on a folder basis, and performs access control according to the access rights of each user.

The CPU 13 reads in the file management table 31 stored in the HDD 14 via the file management system 30, and temporarily stores the file management table 31 in the RAM 16. Then, the CPU 13 updates the contents of the file management table 31 temporarily stored in the RAM 16 according to the generation, movement, duplication, edition, and deletion of files and folders. After termination of the update process of the file management table 31, the CPU 13 updates the file management table 31 stored in the HDD 14 based on the contents of the file management table 31 temporarily stored in the RAM 16.

The file management table 31 has a tree structure as illustrated in FIG. 3A, and is stored in the HDD 14 for management. The tree structure has a parent folder called "root folder" as a starting point, with folders and files stored therein such that further additional folders and files are stored in the folders. The folders are sometimes also referred to as "directories". In the illustrated example, a folder 32 named as "private" is stored in the root. Further, the folder 32 includes folders named as "user A", "user B", and "user C", and the "user C" stores a file 33.

The file management system 30 is equipped with a function for controlling accesses to the files or folders according to the access rights of each user. FIG. 3B shows a file attribute table 34 which indicates attributes and is stored in the file management table 31. Examples of the attributes include an ID, a file name (or folder name), a locked state, an owner name, a display state, and access rights.

The access rights include a read right (r), a write right (w), and an execution right (x). The access right can be set to each of categories of "owner", "group", and "other". The "owner" indicates the owner of a file or a folder. The "group" indicates a group of specific users. The "other" denotes a user other than an owner and users belonging to a group. In the illustrated example, a file name of "File 1" is associated with an access right setting of "rwx/rwx/rwx", which represents that all of owner/group/other are granted r, w, x, i.e. the read right, the write right, and the execution right, and hence, in short, all users can read, write, and execute the file 1. Further, a file name of "File 4" is associated with an access right setting of "rwx/ - - - / - - - ", and hence only a user D, who is the owner of the file 4, can read, write, and execute the file 4.

A folder to which only the owner is granted access rights is sometimes referred to as a "private folder". Although the owner of a folder can easily generate a private folder by changing access rights, each user can generate a private folder when the user acquires an account to access the document management apparatus 100.

Further, when there is no need to perform very complicated access control, access control on a group basis is sometimes inhibited. In such a case, there are provided only shared folders which can be used by all the users, or only shared folders and private folders. Note that even the shared folders may be configured to require password authentication on a folder basis.

The document management apparatus 100 is assumed to be used by a plurality of users, and hence, for prevention of loss of file/folder integrity, the file management system 30 performs lock control of files such that while a user is manipulating (accessing) a file, the file is prevented from being manipulated by another user. The file management system 30 stores a flag (locked state) indicative of whether or not a file is locked, in the file attribute table 34, and is capable of determining based on the flag whether or not the file is being manipulated by a user. In a state where a file or a folder is locked, if another user attempts to delete the locked file or folder, an error of deletion failure is caused.

Further, the document management apparatus 100 has a function of initialization, i.e. collectively deleting files and folders. To perform collective deletion of files and folders, the access rights to files and folder which are not owned are required, and hence the collective deletion can be executed only by a system administrator having access rights to all the files and folders.

The user interface 40, which functions as a display unit and an operation unit, provides an operator interface (I/F) for displaying a display screen and receiving a user's input operation to the system. The main controller 10 receives an input from the user interface 40, and updates the display screen after executing required processing. Note that the user interface 40 is not necessarily required to be provided on the document management apparatus 100. In such a case, it is possible to display a screen or receive an operation from the external apparatus on the LAN 11 via the communication unit 12.

Figure 4:
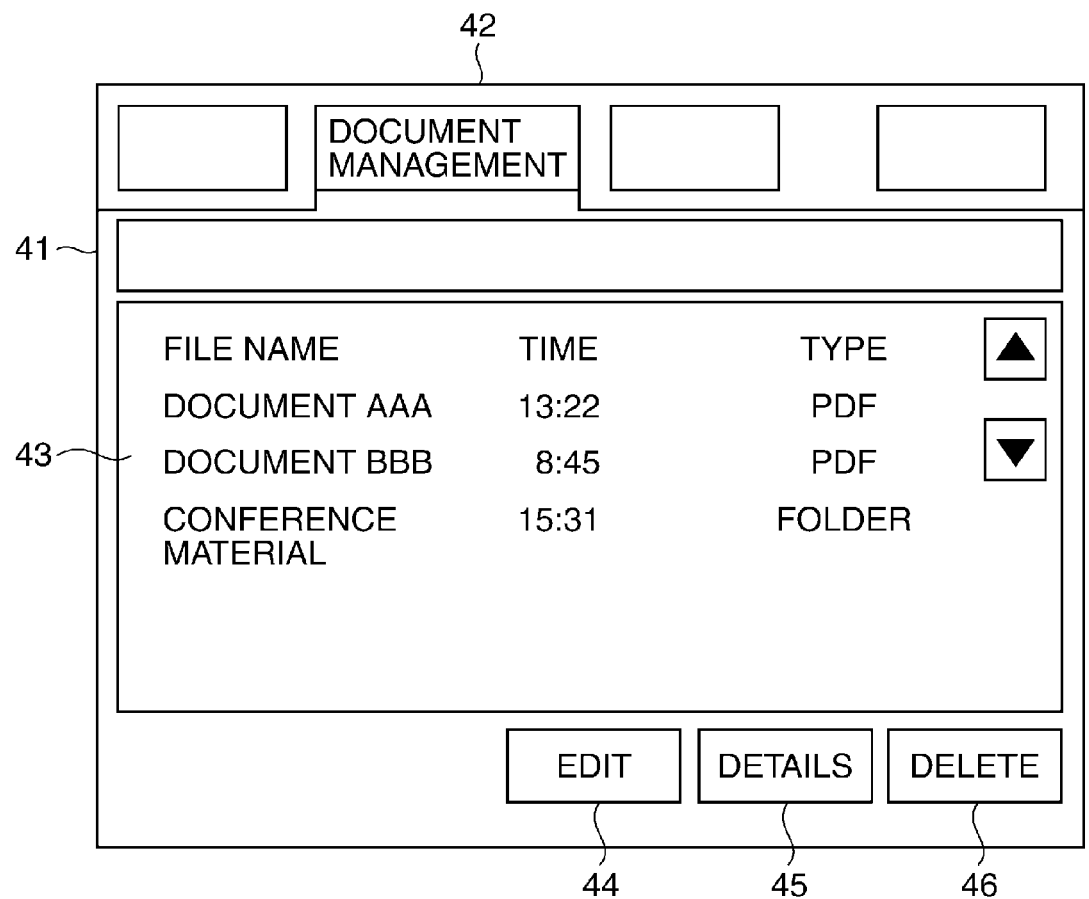
FIG. 4 is a view showing an example of a display screen of a file list displayed by a user interface.

FIG. 4 is a view showing an example of a display screen of a file list displayed by the user interface 40.

Referring to FIG. 4, a file list screen 41 displays an application tab 42 for switching an application to another, and a file list 43 showing a list of files and folders. The file list 43 is composed of file/folder names read out from the file attribute table 34 of the file management table 31, times when files/folders are stored (or generated), types of files/folders, and so forth.

Further, on the file list screen 41, there are arranged an edit button 44 for editing files or folders, a detail button 45 for displaying detailed information on each file or folder, a delete button 46 for deleting files or folders, and so forth.

In the document management apparatus 100, history of manipulations of files or folders by users is stored as an operation log in the HDD 14. For example, when a user opens or deletes a file, details of operation on the file and a user name of the user having manipulated the file are recorded in a record of the operation log. If an error occurs, the record of the operation log makes it possible to identify the details of operation on the file and the user having manipulated the file, which facilitates investigation of the cause of the error.

Next, a collective deletion process executed by the document management apparatus 100 will be described with reference to FIG. 5.

Figure 5:
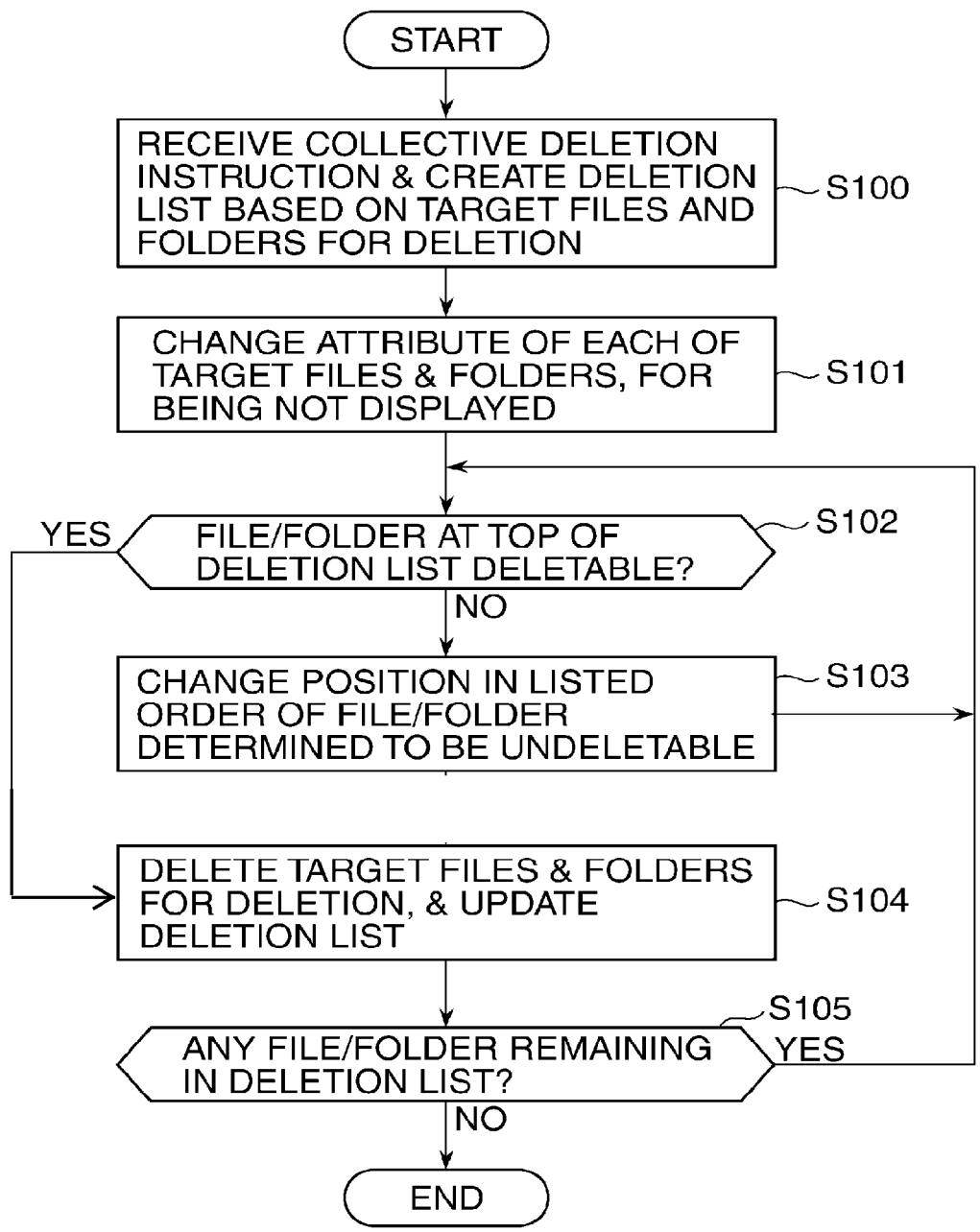
FIG. 5 is a flowchart of a collective deletion process performed by the document management apparatus.

FIG. 5 is a flowchart of the collective deletion process by the document management apparatus 100.

When the main controller 10 has received an instruction for collective deletion of files and folders from the system administrator via the user interface 40, the file management system 30 creates a deletion list based on information on files and folders as targets to be deleted, in the RAM 16 (step S100). The deletion list is a list in which the order of deletion of files and folders as targets to be deleted is described, and the file names and folder names of the files and folders as targets to be deleted are listed in the deletion list. Note that there are no changes in locations where the files and folders are stored. In the step S100, the main controller 10 and the user interface 40 serve as a receiving unit.

Next, the file management system 30 refers to the file attribute table 34, and changes the display state, which is one of the attributes of each of the files and folders as targets to be deleted described in the deletion list, from "TRUE" (displayed) to "FALSE" (not displayed) (step S101). This inhibits the file names and folder names of the files and folders as targets to be deleted from being displayed in the file list 43 on the file list screen 41, whereby it is possible to prevent the files and folders as targets to be deleted from being manipulated by a user other than the system administrator. As a consequence, it is possible to prevent occurrence of an error during the deletion process. In the step S101, the file management system 30 functions as an attribute change unit.

Next, the file management system 30 refers to the "locked states" of the files as targets to be deleted in the file attribute table 34 in order from a file having a file name entered at the top of the deletion list, and determines whether or not deletion of each file as a target to be deleted can be executed (step S102). In the document management apparatus 100, when a file as a target to be deleted is being accessed, the file is locked such that users other than a user accessing the file cannot access the file, and hence the "locked state" of the file is "TRUE" in the file attribute table 34. Therefore, when the "locked state" of a file as a target to be deleted is "FALSE", the file management system 30 determines that deletion of the file can be executed, and when the "locked state" of the file is "TRUE", the file management system 30 determines that deletion of the file cannot be executed. When a target to be deleted is a folder, the determination as to whether deletion thereof can be executed is performed by determining whether or not at least one file whose locked state is "TRUE" is contained in the target folder or its lower-level folders. When at least one such a file is contained, it is determined that deletion of the folder as a target to be deleted cannot be executed, whereas when no such a file is contained, it is determined that the deletion can be executed. In the step S102, the file management system 30 functions as a determination unit.

If it is determined in the step S102 that the deletion of the target file or folder cannot be executed, the file management system 30 changes a position of the file name or folder name of the target file or folder determined to be undeletable, in the order (sequence) of the file names and folder names in the deletion list (step S103). In the step S103, the file management system 30 functions as a changing unit.

If it is determined in the step S102 that the deletion of the target file or folder can be deleted, the file management system 30 executes deletion of the target file or folder and deletes the file name or folder name of the target file or folder from the deletion list (step S104). When all the file names and folder names listed in the deletion list are deleted, the present process is terminated (step S105). In the step S104, the file management system 30 functions as a deletion unit.

Note that when the file management system 30 determines in the step S102 that there is no undeletable file or folder, the file management system 30 may delete the files and folders in the deletion list collectively by deleting the root folder instead of separately deleting the files and folders.

Further, a control method may be modified by changing the file attribute table 34 such that file sizes as well are entered therein, and changing a position in the order of deletion of the file names and folder names in the deletion list in the step S103, for example, such that the order of deletion of the file names and folder names in the deletion list is changed with priority given to files having larger file sizes.

According to the present embodiment, a deletion list is created in which a deletion order of files and folders is described, and positions, in the deletion order, of files or folders determined to be undeletable are changed. With this configuration, after manipulation of files or folders by users has been terminated, the collective deletion is executed by an instruction from the system administrator, so that it is possible to promptly perform collective deletion of the files and folders by the system administrator. Further, even in a case where the document management apparatus records an operation log, deletion of files or folders is performed only after termination of manipulation by a user, which prevents the operation log from recording a deletion failure.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2011-255055 filed Nov. 22, 2011, which is hereby incorporated by reference herein in its entirety.

What is claimed is:

1. A document management apparatus comprising:
a storage device configured to store files and folders, the files and the folders being accessible to users over a network;
at least one memory comprising computer code;
at least one processor, the at least one processor configured to execute the computer code to cause the apparatus to:
receive an instruction for a collective deletion of the files and the folders from a system administrator, thereby starting a collective deletion process;
create a deletion list based on information on the files and the folders to be deleted, the deletion list describing an order of deletion for each of the files and each of the folders to be deleted;
change a display state of the files and the folders to be deleted from a first state that permits display of file names of the files to be deleted and of folder names of the folders to be deleted on a display device and manipulation of the files and the folders to be deleted by one of the users to a second state that inhibits display of the file names of the files to be deleted and of the folder names of the folders to be deleted such that the file names and the folder names are hidden from the one of the users while permitting manipulation of the files to be deleted and the folders to be deleted by the system administrator only;
delete the files and the folders from the storage device in accordance with the order of deletion described in the deletion list;
change the order of deletion described in the deletion list for at least one of the files to be deleted that is being accessed by one of the users when the instruction for collectively deleting the files is received; and
change the order of deletion described in the deletion list for at least one of the folders to be deleted, the at least one folder having a file that is being accessed by one of the users when the instruction for collectively deleting the at least one folder is received,
wherein when not-yet-deleted files are being accessed by users, said delete the files from the storage device includes deleting the not-yet-deleted files after the not-yet-deleted files return to a state where no user accesses thereto,
wherein in a case where a folder to be deleted includes a first file whose deletion can be executed, a second file whose deletion cannot be executed, and a third file whose deletion can be executed, the first file and the third file are not deleted until deletion of the second file can be executed, and
wherein the collective deletion process ends after each of the files and each of the folders included in the deletion list are deleted.

2. The document management apparatus according to claim 1, wherein a root directory storing the files and the folders is deleted when no file or folder of the root directory in the deletion list is being accessed from one of the users.

3. The document management apparatus according to claim 1, wherein one of the files being accessed by one of the users is deleted later than another file not being accessed by one of the users.

4. The document management apparatus according to claim 1, wherein said change the order of deletion described in the deletion list for at least one of the files to be deleted includes changing a position in the listed order with priority given to a file having a larger file size.

5. A method of controlling a document management apparatus including a processor and a storage device configured to store files and folders, the files and the folders being accessible to users over a network, the method comprising:
receiving an instruction for a collective deletion of the files and the folders from a system administrator, thereby starting a collective deletion process;
creating a deletion list based on information on the files and the folders to be deleted, the deletion list describing an order of deletion for each of the files and each of the folders to be deleted;
changing a display state of the files and the folders to be deleted from a first state that permits display of file names of the files to be deleted and of folder names of the folders to be deleted on a display device and manipulation of the files and the folders to be deleted by one of the users to a second state that inhibits display of the file names of the files to be deleted and of the folder names of the folders to be deleted such that the file names and the folder names are hidden from the one of the users while permitting manipulation of the files to be deleted and the folders to be deleted by the system administrator only;
deleting the files and the folders from the storage device in accordance with the order of deletion described in the deletion list;
changing, by the processor, the order of deletion described in the deletion list for at least one of the files to be deleted that is being accessed by one of the users when the instruction for collectively deleting the files is received; and changing, by the processor, the order of deletion described in the deletion list for at least one of the folders to be deleted, the at least one folder having a file that is being accessed by one of the users when the instruction for collectively deleting the at least one folder is received, wherein when not-yet-deleted files are being accessed by users, said deleting the files from the storage device includes deleting the not-yet-deleted files after the not-yet-deleted files return to a state where no user accesses thereto, wherein in a case where a folder to be deleted includes a first file whose deletion can be executed, a second file whose deletion cannot be executed, and a third file whose deletion can be executed, the first file and the third file are not deleted until deletion of the second file can be executed, and wherein the collective deletion process ends after each of the files and each of the folders included in the deletion list are deleted.

6. A non-transitory computer-readable storage medium storing a computer-executable program for causing a computer to execute a method of controlling a document management apparatus including a storage device configured to store files and folders, the files and the folders being accessible to users over a network, wherein the method comprises:

receiving an instruction for a collective deletion of the files and the folders from a system administrator, thereby starting a collective deletion process;

creating a deletion list based on information on the files and the folders to be deleted, the deletion list describing an order of deletion for each of the files and each of the folders to be deleted;

changing a display state of the files and the folders to be deleted from a first state that permits display of file names of the files to be deleted and of folder names of the folders to be deleted on a display device and manipulation of the files and the folders to be deleted by one of the users to a second state that inhibits display of the file names of the files to be deleted and of the folder names of the folders to be deleted such that the file names and the folder names are hidden from the one of the users while permitting manipulation of the files to be deleted and the folders to be deleted by the system administrator only;

deleting the files and the folders from the storage device in accordance with the order of deletion described in the deletion list;

changing the order of deletion described in the deletion list for at least one of the files to be deleted that is being accessed by one of the users when the instruction for collectively deleting the files is received; and changing the order of deletion described in the deletion list for at least one of the folders to be deleted, the at least one folder having a file that is being accessed by one of the users when the instruction for collectively deleting the at least one folder is received, wherein when not-yet-deleted files are being accessed by users, said deleting the files from the storage device includes deleting the not-yet-deleted files after the not-yet-deleted files return to a state where no user accesses thereto, wherein in a case where a folder to be deleted includes a first file whose deletion can be executed, a second file whose deletion cannot be executed, and a third file whose deletion can be executed, the first file and the third file are not deleted until deletion of the second file can be executed, and wherein the collective deletion process ends after each of the files and each of the folders included in the deletion list are deleted.

* * * * *